April 6, 1948.  H. C. KEATING  2,439,091
ELECTRICAL OUTLET BOX MOUNTING
Filed Dec. 18, 1946  2 Sheets-Sheet 1

INVENTOR.
Harry C. Keating,
BY Albert R Henry
ATTORNEYS.

April 6, 1948.                H. C. KEATING                2,439,091
                    ELECTRICAL OUTLET BOX MOUNTING
                       Filed Dec. 18, 1946        2 Sheets-Sheet 2
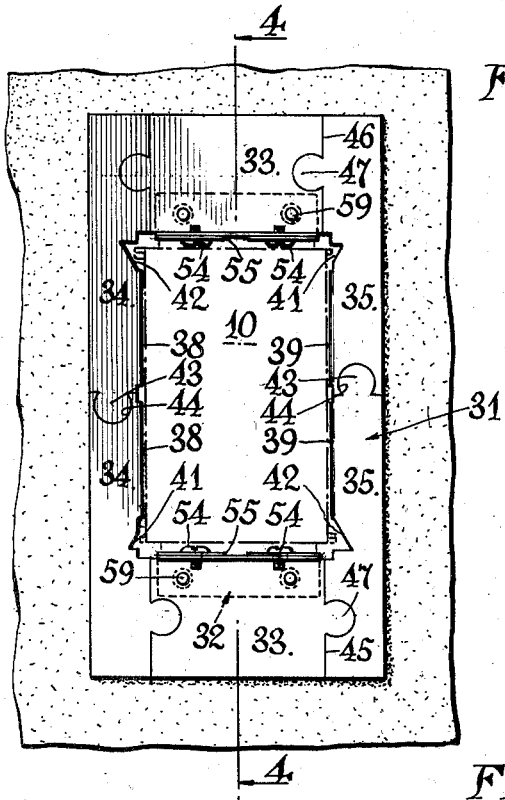
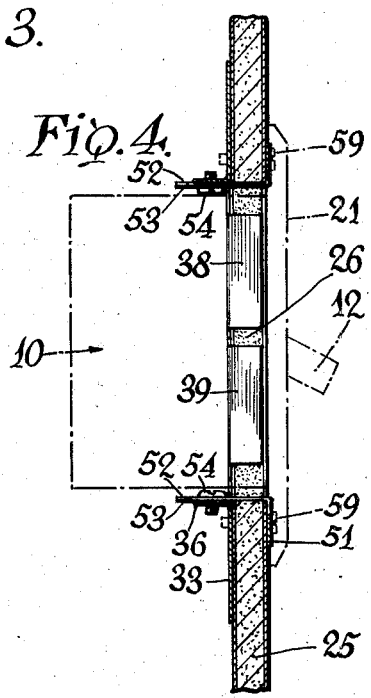
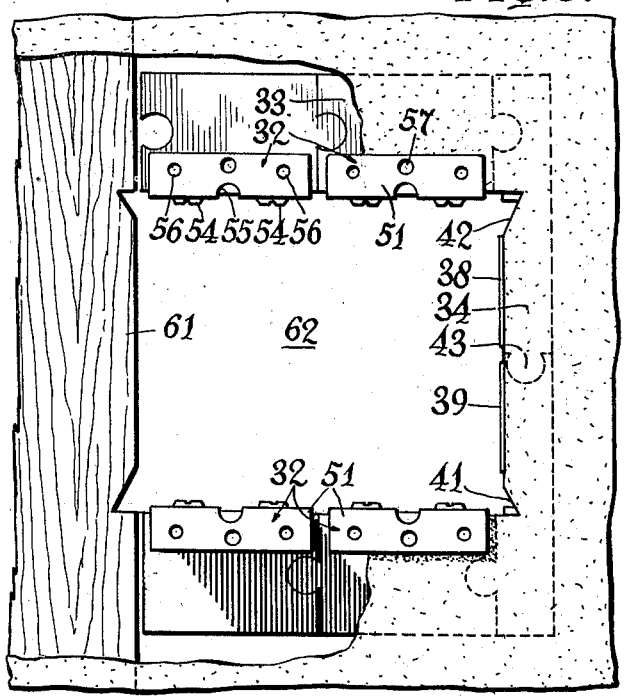
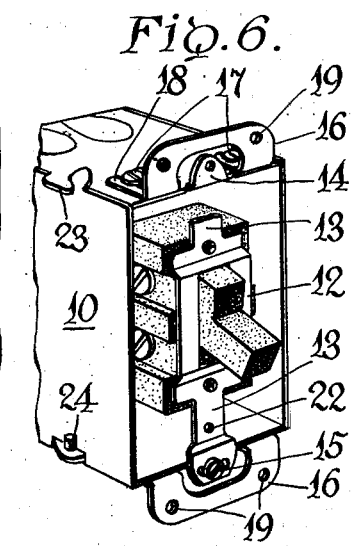
INVENTOR.
Harry C. Keating
BY Albert R. Henry
ATTORNEYS Patented Apr. 6, 1948

2,439,091

UNITED STATES PATENT OFFICE 2,439,091

ELECTRICAL OUTLET BOX MOUNTING

Harry C. Keating, Buffalo, N. Y.

Application December 18, 1946, Serial No. 716,903

7 Claims. (Cl. 248—27)

This invention relates to a mounting or supporting device for an electrical outlet box, and it has particular reference to an article of this class by means of which outlet boxes may be effectively mounted under a wide variety of service conditions.

The customary and approved type of electrical outlet or switch box is intended to be mounted in an opening cut in the wall of a building, so that the open front face of the box is flush with the outer surface of the wall. Lugs or hangers on opposite ends of the box, provided with screw holes, abut the outer wall, and are intended to receive screws by means of which the box is supported in the opening. A cover plate, overlapping the face of the box, may later be applied to protect the box and its contents.

While this type of box is well known and is widely used, considerable difficulty is experienced in many instances in securing the box in place. These installation problems arise from building specifications which pre-locate the outlet, from interferences with studding, and from the inherent weakness of lath and plaster, or plaster board, to retain the securing screws. It has accordingly been proposed to provide templates or reinforcing pieces of sheet metal, so as to give some increased anchorage and support.

Such means as have been heretofore proposed, however, are inadequate to meet many of the conditions which are encountered. For example, the space between the walls, in which the box is to be located, is often restricted, and it may therefore be impossible to position a complete template within such space. Again, the installation may call for a multiple outlet, for which a template designed for a single box is unsuited. Another limitation frequently met is the interference between reinforcing ribs formed on the inner face of the cover plate and template or framing members positioned on the outer surface of the wall opening. These, and other problems, have militated against the use of mounting devices, despite their general desirability.

According to the present invention, there is provided a mounting device, template, or bracket member, so organized as to be applicable to a wide variety of installation problems, which meets the special conditions just referred to, which effectively supports the box in place, which may be quickly and easily installed, and which is inexpensive to manufacture. A further understanding of the invention, and of the advantages to be derived from its use, will appear from the following description of a typical embodiment, illustrated in the accompanying drawings, wherein:

Fig. 3 is a rear elevation of the mounting;

Fig. 4 is a section on the line 4—4 of Fig. 3;

Fig. 5 is a front elevation, with portions broken away, of the mounting device as applied to the solution of a special installation problem, thereby showing the flexibility of the invention; and Fig. 6 is a fragmentary perspective of the open end of an outlet box having a filler member therein.

Figure 1:
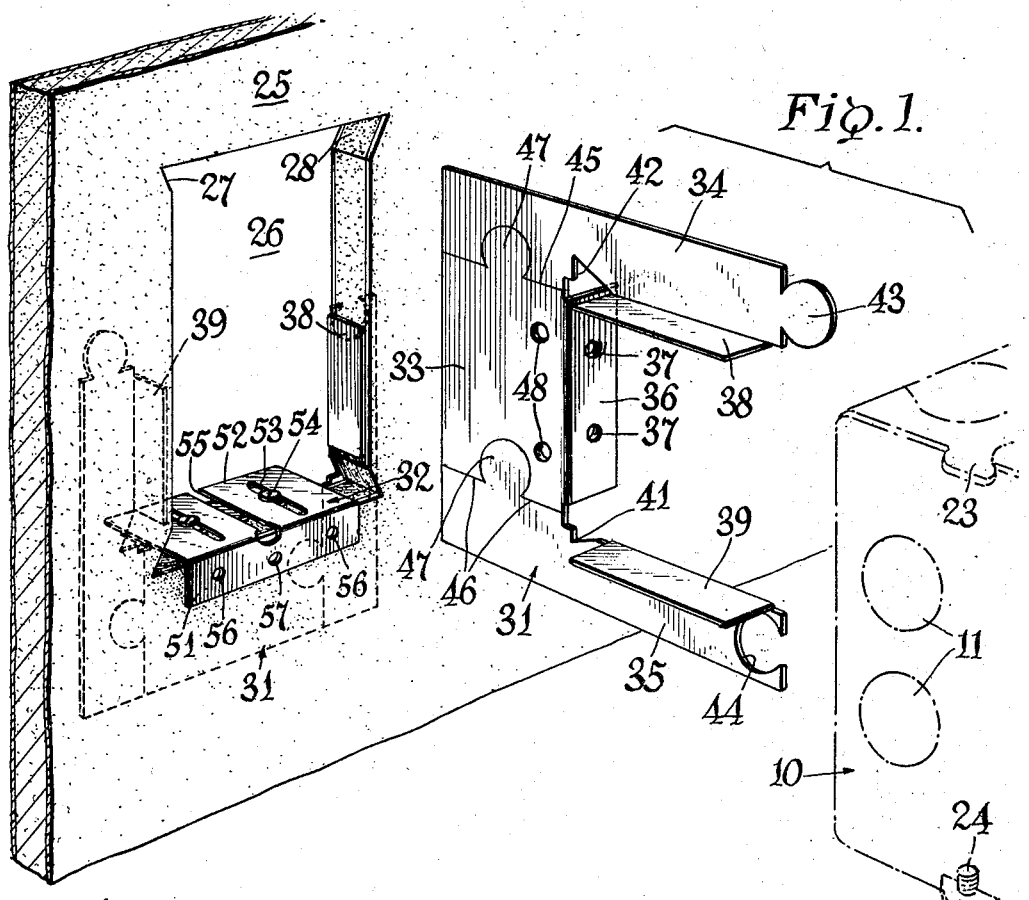
Fig. 1 is an exploded view in perspective, showing a portion of the improved mounting secured in a wall opening, a further portion ready to be positioned therein, and a portion of the outlet box to be secured in the opening.

It is, of course, common knowledge that one standard form of Underwriters' approved outlet box comprises a heavy sheet metal rectangular open-faced box, generally designated by the reference numeral 10, adapted to be let into an opening cut in the wall surface, and provided with knockouts 11 through which the cables may be brought into the box, and between the walls for connection to a switch, or such other member as may be employed for the insides or filler. In the drawings, particularly Figs. 2, 4, and 6, the filler is indicated as a toggle switch 12 provided with arms 13 which extend to and overlap tapped lugs 14 formed on the front top and bottom edges of the box 10. The filler is mounted in the box, and on the centrally disposed lugs, by screws 15. The box is also provided with hangers 16, secured to its upper and lower front edges by screws 17 engaging bifurcated inturned flanges 18, which provide for limited in and out adjustment. In conventional practice, the workman drives screws or nails into spaced holes 19 formed in the hangers, and usually into weak and insecure lath or plaster. The installation, after the necessary electrical connections have been made, is completed by applying a cover 21, which is held on the filler by screws (not shown) entering tapped apertures 22 on the arms 13.

As best shown in Fig. 1, boxes of this nature are formed with detachable sides provided with small depressions to receive a locking lug 23 and a lug and screw 24 formed on the upper and lower opposite ends of the box. When adjacent side plates of two boxes are detached, the two boxes may be interconnected through the lugs and screws, thus forming a double outlet box adapted to receive two fillers. As many boxes may be interconnected in this fashion as is desired, to provide for multiple outlets. The applicability of the present invention to such multiple installations will appear as this description proceeds.

Referring further to Fig. 1, there is shown a wall 25, such as the inner plaster or plasterboard wall of a residence, in which it is desired to mount an outlet box 10 for the reception of a switch, lamp cord plug receiver, or the like. The workman first cuts an opening 26 through the wall 25, preferably of a size just slightly more than the box dimensions. In a typical instance, for a single filler, two by three inch box, this opening will therefore be about a quarter of an inch more on each dimension. A close fit is indicated in the figure by the notches 27 and 28, which provide clearance for the lugs and screws 23 and 24. While this is good practice, it should be pointed out that the efficacy of the present invention does not depend upon cutting such notches, or holding to such close clearances, as the description will make clear.

Rather than attempting to affix the lugs 16 of the box 10 directly to the plaster wall 25, the present invention contemplates the provision of a mounting device, which may be generally described as comprising a backing plate 31 and a clamping plate 32. One or more pairs of these plates, or portions thereof, may be employed, depending upon the particular nature of the problem encountered.

The plate 31, as shown in Fig. 1, comprises a relatively wide web section 33 from which extend side legs 34 and 35 to embrace an opening substantially equal to half the frontal area of the box 10, plus a slight clearance of say 1/16 inch along the side margins. The section 33 is provided along its inner margin with a flange 36 provided with spaced tapped holes 37, and which flange is turned inwardly at right angles to the web and legs, or away from the wall opening 26. The legs 34 and 35 are each provided with an outwardly turned flange 38 and 39 respectively, of a width approximately that of the plaster, or say 3/8 to 1/2 inch. These flanges, upon assembly, lie close to the cut edges of the plaster, and provide protection against abrasion and crumbling.

The plate is readily formed by conventional stamping operations from light sheet metal, the flanges 36, 38, and 39 being formed from the central portion of the blank. The corners between the web 33 and the side legs 34 and 35 are also notched, as indicated by the reference numerals 41 and 42, so as to provide clearance slots for the lugs and screws 23 and 24 on the box 10, and at the same time frame the box with very slight clearance. Inasmuch as flange 36 consumes a part of the blank, it is obvious that the flanges 38 and 39 terminate, at the web ends, below the notches, and they are also made to terminate short of the ends of the legs 34 and 35.

The leg 34 is formed at its extremity with a circular tab 43, while the leg 35 is formed with a complementary circular opening 44, of such total arc and dimension that the tab may lock in the opening in the manner of a dovetail joint. It is intended that the plates 31 may be used in pairs, with the leg 34 of one member having the tab, and the aligning leg of the other having the opening. Accordingly, two such plates may be interconnected inside of the wall, to form a framing member completely encircling the opening 26, as is clearly shown in Fig. 3.

It will have been noted that the web 33 is provided with score lines 45 and 46, extending generally parallel to the side edges of the plate 31, and located at a distance closer to the center of the plate than the flanges 38 and 39, by an amount corresponding to the width of the metal of the box 10. These lines are curved at about the center section of the web, to define tabs 47, similar to the tabs 43. In manufacture, the score lines are cut or marked into the blank to a depth which will enable the workman to break the plate 31 along the lines by bending back and forth between the fingers. Sufficient strength is retained, however, in the complete plate, to insure its proper functioning as a supporting and framing member. The usage of these frangible sections will be explained directly. The web 33 is also formed with spaced tapped openings 48, adapted to receive and secure screws passing through the holes 19 of the box hangers 16. The openings 48 are therefore disposed on the same center spacing, but of course are misaligned with respect to the tapped openings 37 to forestall interference.

The clamping plate 32 comprises an angle shaped piece of sheet metal having a front flange 51, adapted to abut the outer face of the wall 25, and an inwardly extending flange 52 adapted to enter the opening 26 and to rest on the flange 36 of the plate 31. The flange 52 is formed with inwardly extending slots 53, spaced the same distance as the holes 37, so that the plate 32 may be connected to the plate 31 by means of screws 54. It will be seen that the slots permit of adjustment of the two plates, so that they may be brought up in tight engagement with opposite surfaces of the wall 25, despite irregularities or dimensional changes which may be encountered.

The median portion of the flange 52 is formed with a slot 55, which provides clearance for the box lug 14 and the screw 15 employed to secure the filler piece 12. The front flange 51 is formed with holes 56, adapted to align with the taps 48 of the plate 31 and with the holes 19 in the box hanger 16. The front flange is also provided with an auxiliary or reserve opening 57, which may be employed in special instances.

Figure 2:
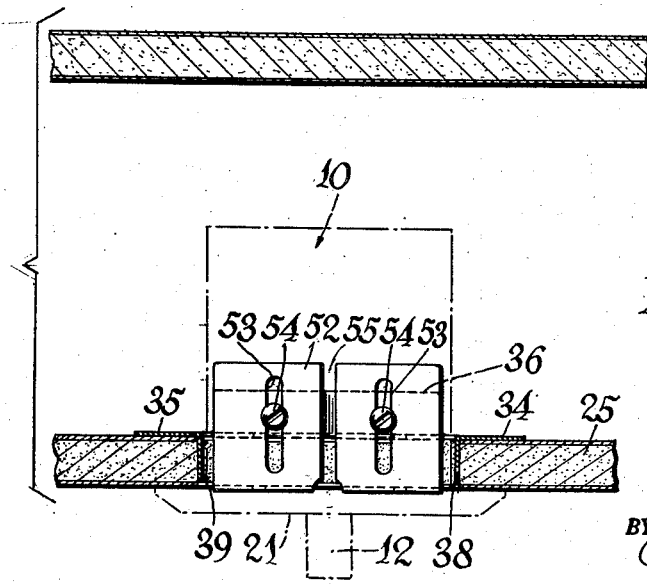
Fig. 2 is a horizontal section through the wall opening showing the mounting positioned therein—an outlet box and cover being indicated in broken lines.

In use, the opening 26 in the wall 25 having been cut as described, the workman takes a set of plates, such as two plates 31 and two plates 32, to the opening 26, which has been considered to be a single box opening. If the two back plate sections 31 are connected together (as they well might be in fabrication through frangible joints) he separates the sections by wiggling and bending, so that the tabs 43 are released from the embracing openings 44. One half of the back section, such as a single plate 31, is then passed through the hole 26, and is held up against the inner wall with the fingers, in the position shown in dotted lines in Fig. 1, with the flanges 38 and 39 disposed along the cut edges. The clamping plate 32 is then laid along the edges of the opening, resting on the flange 36 and the wall, and it is secured and drawn up by screws 54. If the wall is made of lath and plaster, the back plate 31 might strike a rough plaster bond, protruding between the lath, and in such case it will not lie perfectly flush against the inner wall, as illustrated in Figs. 2 and 4. However, this does not interfere with the assembly, as the parts may be adjusted as required, through the screw and slot connections. A secure mounting, extending over a substantial wall area, is obtained in either case.

The workman then passes the other plate 31 through the opening 26, brings it up against the wall in the same manner, and presses the tabs 43 at the ends of the side legs into their complementary dovetail openings 44 on the aligned legs. The other clamping plate is then positioned and secured in the manner just described, to frame the entire opening in a substantial manner. It may be pointed out that it is not practical, in the great majority of installations, to use a single four-sided plate on the back wall. This is for the reason that such a plate, dimensioned to provide adequate surface contact or bearing area, would be too large to pass through an opening adapted to receive the box itself with close clearance. It would not aid to cut a larger opening, for then the cover plate 21 could not be made to cover the entire hole. Therefore the provision of a double section back plate, which can be positioned in the limited room available, is a feature of practical importance.

After the foregoing framing operation is completed, the box 10, with the indicated knockouts 11 removed, is brought to the opening, and the wires are fished and connected in the usual manner. The box is then pushed home, the notches 41, 42, and 55 on the supporting member providing clearance for the projecting members on the box. Screws 59 (Fig. 2) are then passed through the openings 19 in the hangers 16, to engage the aligned openings 56 and 48.

It is frequently found, in fitting outlet boxes, that although the workman uses care, he misaligns his assembly, so that the cover plate 21 is skewed on the wall and presents an unsatisfactory appearance. Some limited measure of adjustment is provided in various fillers by forming the hole in the filler arm 13, which receives the screw 15, as an arcuate slot. This, however, is often inadequate to bring the plate 21 plumb. According to the present invention, there is therefore provided the auxiliary or reserve opening 57 in the flange 51 of the clamping plate 32. To utilize this opening, the workman snips through the center part of the hanger 16 with his pliers, and drives home a screw through the tap 57, the screw head thus catching the cut edges of the hanger 16 and supporting the box in an adequate manner. By this means, misalignments of considerable magnitude can be corrected.

It has been noted that the supporting device of this invention is applicable to a wide variety of installation problems, as well as the usual problem presented in connection with Fig. 1. A compound problem, and its solution, is shown in Fig. 5. It will be assumed, first, that a multiple box assembly is required, and second, that the location is such as to bring the outlet against a wall stud 61, or other frame member, which delimits one side of the openings 62.

Two sets of supporting units are therefore selected, and the side legs 34 and 35 of one pair of plates 31 are removed by bending between the fingers along the score lines 45 and 46. The webs 33 of the other pair are also removed from both side legs, and, through the medium of the dovetailing tabs 47, these webs are connected to the webs 33 of the first set. The retained side legs are positioned on that edge of the opening remote from the stud 61, to frame it in the manner clearly shown in the figure. Inasmuch as there would be interference at the left hand margin of the opening, if the side legs had been retained, such legs have also been discarded. The double box may be mounted in the manner previously described. It will be noted that a close fit can be obtained, because the score lines 45 and 46 are closer to the vertical center line than the flanges 38 and 39, to compensate for the overall loss of width when the sides of two boxes are removed to form a double outlet.

Obviously, many other cases of special installations can be stated, but the foregoing compound case is thought sufficient to show how the present invention can be applied to all such problems.

In Figs. 2 and 4, the cover plate 21 is shown as fitting flush and snugly against the outer surface of the wall 25, which, of course, is the desirable situation. Due to the formation of contemporaneous cover plates of plastic material, it is expedient to provide the inner surfaces thereof with reinforcing beads. These have been found, in a number of instances, to interfere with supporting plates in which a portion of the support abuts the outer wall along the longer dimension of the box. It will be seen that, in the present invention, outer side flanges have been eliminated, and that the outer flanges 51 of the clamping members are of insufficient width to force the cover 21 away from the wall.

While the present invention has been described with reference to one specific embodiment and typical applications thereof, it will be understood that such embodiment is illustrative, and it is not intended that the invention should be restricted to all of the details and arrangements as herein set forth. Those skilled in the art will appreciate that such embodiment is susceptible of numerous modifications and variations without departure from the principles of the invention, and therefore it is intended that the invention should be deemed commensurate with the scope of the following claims.

I claim:

1. A mounting member for an electrical outlet box comprising a back plate having a web and parallel side legs extending from the web to define a partially closed opening adapted to frame at least substantially half of a box, a flange on the web positioned between the legs at substantially right angles thereto, said flange being formed with screw receiving apertures, a clamping plate having a flange adapted to abut the front wall of a box opening and an angularly disposed flange adapted to be positioned between said legs and on said first named web flange, said angularly disposed flange being formed with inwardly extending slots adapted to be aligned with said screw receiving apertures, said clamping plate being thereby adjustably securable in an in-and-out direction by means of screws passing through said slots and apertures.

2. A mounting member for an electrical outlet box comprising a back plate having a web and parallel side legs extending from said web, a rearwardly extending apertured flange formed on said web between the legs, forwardly extending flanges formed on said side legs, said rearwardly and said forwardly extending flanges being at substantially right angles to each other and to said web and legs, a clamping plate comprising a pair of right angled flanges one of which is adapted to rest on said rearwardly extending flange, complementary means on said last named flanges for adjustably interconnecting and securing the same in an in-and-out direction, aligned openings on the web and other flange of the clamping plate adapted to receive box supporting screws, and notches formed at the corners between said web and side legs whereby said member may be so proportioned as to embrace closely an outlet box and said side leg forwardly extending flanges may simultaneously closely embrace a wall aperture for said box.

3. A mounting member for an electrical outlet box comprising a back plate having a web and parallel side legs extending from said web, a rearwardly extending flange on the web between the side plates, a clamping plate having a front wall engaging flange and an inwardly extending flange adapted to rest on said web flange, adjustably positionable means for interconnecting and securing said web flange and inwardly extending flanges, and detachable dovetail connectors between said web and side legs whereby a plurality of said back plates may be interassembled to accommodate box openings of various widths.

4. A mounting member for an electrical outlet box comprising a back plate having a web and parallel side legs extending from said web, a flange on the web between the legs, a clamping plate including a rearwardly extending flange adapted to be positioned on and secured to the web flange, said clamping plate also including a front flange adapted to engage a wall surface and formed with means to receive box securing means, said side legs terminating in complementary tabs and openings mutually interengageable to form locked joints, whereby pairs of said back plates may be passed through a wall opening and interconnected therebeyond through said joints and to an outlet box through said clamping plates and webs.

5. A mounting member for electrical outlet boxes comprising a web, side legs extending from said web, an inwardly turned flange on the web, outwardly turned flanges on the side legs, said last named flanges terminating short of the web flange and the ends of the legs, detachable interlocking joints between the web and the side legs, said joints being located along lines inside of the projection of the leg flanges, complementary interlocking joint members formed at the ends of said legs whereby pairs of legs may be joined in endwise relation, a clamping plate having an inwardly turned flange adapted to rest on said web flange, means adjustably interconnecting said last named flanges, box securing means formed on said clamping plate and web, said web, flanges, and plates being so proportioned with respect to each other as to embrace closely a unit outlet box in a wall opening, said interlocking joints being so positioned on said web and legs as to couple a plurality of web and leg sections to each other to accommodate multiple outlet boxes.

6. A mounting member for electrical outlet boxes comprising a back plate adapted to be passed through a wall opening and abutted flat thereagainst, said back plate including a web having a rearwardly extending flange thereon and side legs having outwardly extending flanges formed thereon, a clamping plate comprising conjoined angle sections respectively adapted to abut the outer wall adjacent the opening and to rest on said web flange, screw receiving slots formed in said clamping plate to adjustably connect said clamping plate to said web flange and thereby said back plate, a centrally disposed clearance slot formed in said clamping plate, and notches formed in said back plate at the corners between the flanges thereof, whereby said mounting member may snugly receive the walls of an outlet box having projections extending therefrom.

7. In a mounting member for electrical outlet boxes, a back plate member having a web and a pair of side legs extending from the web in parallel spaced relation, said web and legs being detachably interconnected through dovetail joints, the roots of said joints being spaced on said web a distance substantially equal to the internal width of the box to be mounted, the jointed portion of said web containing at least one tail and one socket, the complementary socket and tail being formed respectively on said side legs, a dovetail joint element formed at the extremities of each of said legs, the element on one leg being a tail and the element on the other leg being a socket, the distance from the inner edge of said web to the root of said last named tail being slightly greater than half the external length of said box, means on said webs whereby said back plate member may be mounted on a building wall to securely receive an outlet box, said complementary tails and sockets enabling the web and side legs of said back plate member to be selectively connected to the webs and legs of other back plate members likewise fashioned.

HARRY C. KEATING.

REFERENCES CITED

The following references are of record in the file of this patent:

UNITED STATES PATENTS

| Number | Name | Date |
|---|---|---|
| 1,113,092 | Bengler | Oct. 6, 1914 |
| 2,309,189 | Hancock et al. | Jan. 26, 1943 |